(12) United States Patent
Lachwani et al.

(10) Patent No.: US 9,274,935 B1
(45) Date of Patent: Mar. 1, 2016

(54) APPLICATION TESTING SYSTEM WITH APPLICATION PROGRAMMING INTERFACE

(71) Applicant: Google Inc., Mountain View, CA (US)

(72) Inventors: Manish Lachwani, Sunnyvale, CA (US); Jay Srinivasan, San Francisco, CA (US); Pratyus Patnaik, San Francisco, CA (US); Rahul Jain, San Francisco, CA (US)

(73) Assignee: Google Inc., Mountain View, CA (US)

( * ) Notice: Subject to any disclaimer, the term of this patent is extended or adjusted under 35 U.S.C. 154(b) by 222 days.

(21) Appl. No.: 13/741,989

(22) Filed: Jan. 15, 2013

(51) Int. Cl.
*G06F 9/44* (2006.01)
*G06F 15/173* (2006.01)
*G06F 15/16* (2006.01)
*G06F 11/36* (2006.01)

(52) U.S. Cl.
CPC .......... *G06F 11/3688* (2013.01); *G06F 11/368* (2013.01); *G06F 11/3672* (2013.01); *G06F 9/44* (2013.01); *G06F 11/3684* (2013.01)

(58) Field of Classification Search
CPC . G06F 11/362; G06F 11/368; G06F 11/3672; G06F 11/3684; G06F 11/3688; G06F 11/3696; G06F 11/3664; G06F 9/542; G06F 8/00; G06F 8/34; G06F 8/61; G06F 9/45533; G06F 9/45558; G06F 9/45537; G06F 9/44; H04L 12/2697; H04L 12/2602
See application file for complete search history.

(56) References Cited

U.S. PATENT DOCUMENTS

| 4,953,084 | A | 8/1990 | Meloy et al. |
|---|---|---|---|
| 6,131,188 | A | 10/2000 | Goebel |
| 6,145,122 | A | 11/2000 | Miller et al. |
| 6,151,701 | A | 11/2000 | Humphreys et al. |
| 6,269,330 | B1 | 7/2001 | Cidon et al. |
| 6,598,221 | B1 | 7/2003 | Pegatoquet et al. |
| 6,829,733 | B2 | 12/2004 | Richardson et al. |
| 6,958,977 | B1 | 10/2005 | Mitrani et al. |
| 7,051,238 | B2 | 5/2006 | Gardner et al. |
| 7,342,897 | B1 * | 3/2008 | Nader ................. H04L 12/2602 370/241 |
| 7,418,697 | B2 | 8/2008 | Gryko et al. |
| 7,805,707 | B2 | 9/2010 | Pouliot |

(Continued)

OTHER PUBLICATIONS

Reda Siblini et al., Testing Web Services, 2005 IEEE, [Retrieved on Dec. 20, 2015]. Retrieved from the internet: <URL: http://ieeexplore.ieee.org/stamp/stamp.jsp?tp=&arnumber=1387124> 8 Pages (1-8).*

(Continued)

*Primary Examiner* — Thuy Dao
*Assistant Examiner* — Anibal Rivera
(74) *Attorney, Agent, or Firm* — McDonnell Boehnen Hulbert & Berghoff LLP

(57) ABSTRACT

A system is described for testing an application on one or more host devices in a host device farm. A build server uses an application programming interface ("API") to send a test package containing an application to a test server. The sending may be initiated by a single action such as a click on a control in a user interface, or may be automatic such as on completion of a build. The test server may then execute and test the application across one or more host devices. These host devices may include smartphones, tablet computers, televisions, set-top boxes, in-vehicle computer systems, home entertainment systems, and so forth. Test results based at least in part on the execution of the application module on the one or more host devices may then be provided to the build server.

21 Claims, 8 Drawing Sheets

(56) References Cited

U.S. PATENT DOCUMENTS

| | | | |
|---|---|---|---|
| 7,870,540 B2 | 1/2011 | Zare et al. | |
| 7,921,197 B2* | 4/2011 | Soundararajan | H04L 12/2697 709/223 |
| 7,991,747 B1 | 8/2011 | Upadhyay et al. | |
| 8,174,991 B1* | 5/2012 | Trivedi | H04L 12/2697 370/241 |
| 8,370,810 B2 | 2/2013 | Oda | |
| 8,479,166 B2 | 7/2013 | Nir-Buchbinder et al. | |
| 8,479,297 B1* | 7/2013 | Edukulla | H04L 63/1433 713/188 |
| 8,504,987 B2 | 8/2013 | Li et al. | |
| 8,626,827 B1 | 1/2014 | Cabrera et al. | |
| 8,649,271 B2* | 2/2014 | Jackson | H04L 12/2697 370/241 |
| 8,671,080 B1 | 3/2014 | Upadhyay et al. | |
| 8,738,761 B2* | 5/2014 | Raisoni | H04L 43/12 709/203 |
| 8,776,028 B1* | 7/2014 | Enakiev | G06F 11/3664 714/38.11 |
| 8,839,222 B1* | 9/2014 | Brandwine | G06F 8/65 717/168 |
| 8,868,981 B2* | 10/2014 | Glaser | G06F 11/3684 714/25 |
| 2002/0010710 A1 | 1/2002 | Binnig | |
| 2002/0040470 A1 | 4/2002 | Guthrie et al. | |
| 2002/0166081 A1 | 11/2002 | Richardson et al. | |
| 2003/0221184 A1 | 11/2003 | Gunjal et al. | |
| 2004/0194072 A1 | 9/2004 | Venter | |
| 2005/0220035 A1 | 10/2005 | Ling et al. | |
| 2005/0273776 A1 | 12/2005 | Guilford | |
| 2005/0278707 A1 | 12/2005 | Guilford | |
| 2006/0059253 A1 | 3/2006 | Goodman et al. | |
| 2006/0242709 A1 | 10/2006 | Seinfeld et al. | |
| 2007/0061780 A1* | 3/2007 | Pokluda | G06F 11/3672 717/124 |
| 2007/0288644 A1 | 12/2007 | Rojas et al. | |
| 2009/0112562 A1* | 4/2009 | Holcomb | H04L 12/2697 703/20 |
| 2009/0150420 A1 | 6/2009 | Towner | |
| 2010/0095021 A1 | 4/2010 | Samuels et al. | |
| 2010/0192120 A1* | 7/2010 | Raleigh | G06Q 10/06375 717/101 |
| 2010/0291907 A1 | 11/2010 | MacNaughtan et al. | |
| 2011/0047597 A1* | 2/2011 | Mahaffey | G06F 21/564 726/3 |
| 2011/0289483 A1 | 11/2011 | Williams et al. | |
| 2012/0035904 A1* | 2/2012 | Seckendorf | B21D 5/00 703/21 |
| 2012/0260344 A1 | 10/2012 | Maor et al. | |
| 2013/0060890 A1 | 3/2013 | Lee et al. | |
| 2013/0152047 A1* | 6/2013 | Moorthi | G06F 11/368 717/124 |
| 2013/0185798 A1 | 7/2013 | Saunders et al. | |
| 2013/0227636 A1 | 8/2013 | Bettini et al. | |
| 2013/0276061 A1 | 10/2013 | Chebiyyam et al. | |
| 2013/0282892 A1 | 10/2013 | Levi et al. | |
| 2013/0326488 A1* | 12/2013 | Reuven | G06F 9/44 717/135 |
| 2014/0020096 A1 | 1/2014 | Khan et al. | |
| 2014/0056153 A1 | 2/2014 | Monnes et al. | |
| 2014/0082729 A1 | 3/2014 | Shim et al. | |
| 2014/0357250 A1* | 12/2014 | Nitsan | H04W 24/06 455/418 |

OTHER PUBLICATIONS

Xiaoying Bai et al., WSDL-Based Automatic Test Case Generation for Web Services Testing, 2005 IEEE, [Retrieved on Dec. 20, 2015]. Retrieved from the internet: <URL: http://ieeexplore.ieee.org/stamp/stamp.jsp?tp=&arnumber=1551150> 6 Pages (1-6).*
Pyzocha, "Non Final Office Action dated Sep. 9, 2014", U.S. Appl. No. 13/655,667, The United States Patent and Trademark Office, Sep. 9, 2014.
Seo, et al., "Analysis on maliciousness for mobile applications", 2012 Sixth International Conference on Innovative Mobile and Internet Services in Ubiquitous Computing, IEEE, 2012, pp. 126-129.
Pyzocha, "Non Final Office Action dated May 13, 2014", U.S. Appl. No. 13/655,667, The United States Patent and Trademark Office, May 13, 2014.
"Debugserver", [online] [retrieved on Apr. 22, 2014] Retrieved from the Internet: <http://iphonedevwiki.net/index.php/ Debugserver>.
Chowdhury, "Non Final Office Action dated Feb. 13, 2014", U.S. Appl. No. 13/631,919, The United States Patent and Trademark Office, Feb. 13, 2014.
lldbilvm.org, "The LLDB Debugger", [online] [retrieved Apr. 22, 2014] Retrieved from the Internet: <http://lldb.llvm.org/>.
Charles Lu, "Debug Java applications remotely with Eclipse", developerWorks, IBM, Dec. 9, 2008, [online] [retrieved on Apr. 22, 2014] Retrieved from the Internet: <http://www.ibm.com/developerworks/library/os-eclipse-javadebug/index.html>.
Javin Paul, "How to setup Java remote debugging in Eclipse", Javarevisited-Blog about Java programming language, Fix Protocol, Tibco Rendezvous and related Java technology stack, Feb. 25, 2011, [online] [retrieved Apr. 22, 2014] Retrieved from the Internet: <http://javarevisited.blogspot.com/2011/02/how-to-setup-remote-debugging-in.html>.
Bakos, et al., "Lightweight Error Correction Coding for System-Level Interconnects", IEEE Transactions on Computers, vol. 56, No. 3, Mar. 2007, pp. 1-16 [online], [retrieved on Jul. 2, 2014]. Retrieved from the Internet <URL:http://kona.ee.pitt.edu/steve/Recent%20Publications/TC_2007_TC-0414-1105-1.pdf>.
Chowdhury, "Notice of Allowance dated Jul. 2, 2014", U.S. Appl. No. 13/631,919, The United States Patent and Trademark Office, Jul. 2, 2014.
Coyer, "Non Final Office Action dated Jun. 5, 2014", U.S. Appl. No. 13/721,632, The United States Patent and Trademark Office, Jun. 5, 2014.
Dearle, "Software Deployment, Past, Present and Future", IEEE 2007, pp. 1-16 [online], [retrieved on Jul. 2, 2014]. Retrieved from the Internet <URL:http://www.cs.tufts.edu/comp/250SA/papers/dearle2007.pdf>.
Guglielmo, et al., "Model-Driven Design and Validation of Embedded Software", 2011 ACM, pp. 98-104 [online], [retrieved on Jul. 2, 2014]. Retrieved from the Internet <URL:http://dbonline.igroupnet.com/ACM.TOOLS/Rawdata/Acm1106/fulltext/1990000/1982616/p98-guglielmo.pdf>.
Rueher, et al., "Capturing Software Processes Through the Generated Objects", 1988, pp. 148-152 [online], [retrieved on Jul. 2, 2014]. Retrieved from the Internet <URL:http://delivery.acm.org/10.1145/80000/75138/p148-rueher.pdf>.
Lachwani et al., U.S. Appl. No. 13/680,671, filed Nov. 19, 2012, 56 pages.

* cited by examiner

APPLICATION TESTING SYSTEM WITH APPLICATION PROGRAMMING INTERFACE

BACKGROUND

With the growing popularity of computing devices, there is an increasing demand for applications, or apps, to run on such devices. These devices may include smartphones, tablet computers, televisions, set-top boxes, in-vehicle computer systems, home entertainment systems, and so forth. To satisfy this demand, programmers are constantly building, testing, and maintaining applications. Testing of these applications is useful for quality assurance to find and correct errors.

Figure 1:
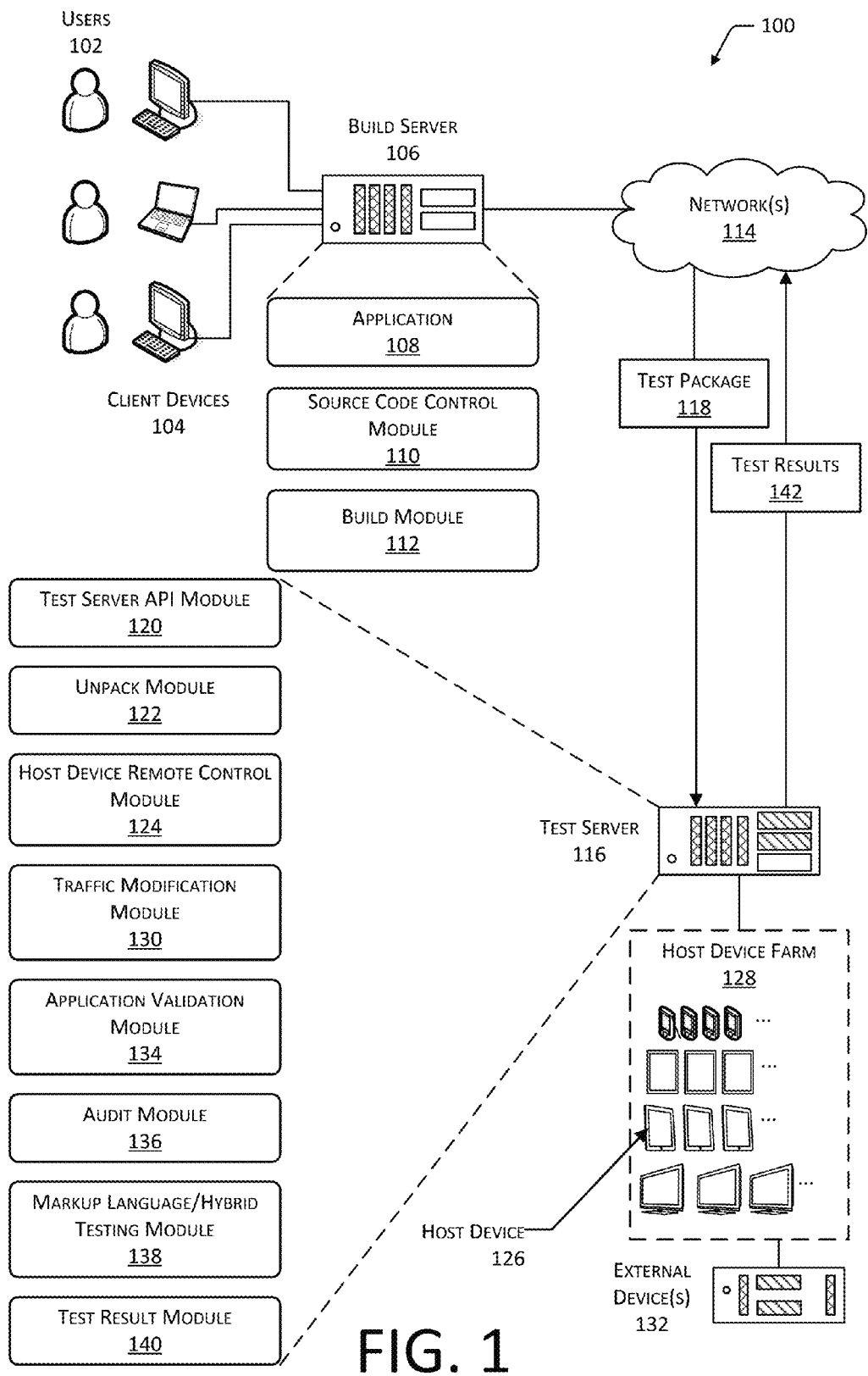
FIG. 1 depicts a system for integrating testing of applications provided by a build server on one or more remote host devices.

Certain implementations and embodiments will now be described more fully below with reference to the accompanying figures, in which various aspects are shown. However, various aspects may be implemented in many different forms and should not be construed as limited to the implementations set forth herein. Like numbers refer to like elements throughout.

DETAILED DESCRIPTION

Overview

A wide variety of applications (or "apps") are developed for execution on computing devices including smartphones, tablet computers, televisions, set-top boxes, in-vehicle computer systems, home entertainment systems, and so forth.

There is an increasing demand for software users to build apps to run on such devices. Software users build, test, and maintain applications using a variety of development and build tools. Testing provides many benefits including finding and correcting errors, improving performance, and so forth. Testing may include observing processor usage, observing memory allocation, programmatic debugging, determining usability, validating functionality, identifying regressions, and so forth.

Continuous integration and other application development methodologies encourage frequent testing of ongoing builds of an application. For example, code for an application may be checked into a build server which creates a build. This build may then be used for ongoing development, troubleshooting, testing, and so forth. By increasing the frequency of builds of the application, problems with a build may be identified more quickly and the application development process may be improved.

Traditional testing systems lack the ability to provide development tools for testing of applications executing on computing devices. Software users have had to rely on cumbersome methods for testing, including use of software simulators, manually provisioning and testing on computing devices connected to a particular user's desktop computer, and so forth. Simulators lack the full fidelity provided by execution on the actual computing device, resulting in incomplete testing. Manual provisioning and testing with a connected computing device is time intensive and may result in the user's desktop computer being occupied with running the testing process in conjunction with the connected computing device.

This disclosure describes embodiments of systems and methods for testing applications using one or more actual computing devices, also known as host devices. A client device such as a desktop computer, laptop, and so forth may work in conjunction with a build server. The build server may be configured to support development of the application by maintaining and generating one or more builds of the application from source code ("code") provided by users or other sources. These builds may then be sent for testing.

In one implementation, the build server may generate a test package including a build of the application. The test package is sent to a test server using an application programming interface ("API"). The API may implement a representational state transfer ("REST") sent using hypertext transfer protocol ("HTTP"). The generation of the test package, sending the test package, or both, may be initiated by a user activating a control, automated process, or combination thereof.

The test server receives the test package and configures one or more host devices to execute the application. This execution may include testing, monitoring, and so forth, configured to generate test results. The test results may then be returned to the build server, the client devices, or both. In some implementations the test results may comprise information expressed as extensible markup language ("XML"), JavaScript Object Notation ("JSON"), or both.

By providing the functionality for the build server to easily transfer the test package to the test server and return test results, the overall testing process for applications configured for deployment and execution on the host devices may be expedited. The host devices used during testing may vary from one another in hardware, software, configuration, and so forth. Additionally, the use of a plurality of host devices allows for contemporaneous testing in parallel, reducing time to provide test results compared to a sequence of serial tests on a single host device. Finally, the use of the actual computing device during testing provides the highest fidelity testing available which is representative of the end-user experience, which may improve quality of the application as released to the end user.

Illustrated Environment

FIG. 1 depicts a system 100 for integrating testing of applications on remote host devices. One or more users 102, such as software developers, may use one or more client devices 104 coupled to a build server 106 to work with an application 108. The application 108 may include an application which is undergoing initial development, ongoing development, maintenance, and so forth.

The application 108 may be a native app, a markup language application, hybrid app, or a browser-based application. Native applications are those which are written and compiled for execution on the particular device. For example, native applications may be written in a programming language such as C++ or Objective C and compiled into native code such as a binary executable for use on the device. Markup language applications include one or more instructions in a markup language which may be rendered by a layout engine and one or more instructions in a scripting language which may be interpreted by a scripting language engine during execution. For example, a hypertext markup language ("HTML") version 5 (or greater) markup language application may include HTML, cascading style sheets ("CSS"), and JavaScript. In some implementations the markup language application may have multiple instances of the UIWebView class references. Hybrid applications include native code and markup language application portions. Browser-based applications are processed within a web browser application and are limited in execution. The browser-based applications may have only a single UIWebView instance.

The build server 106 may comprise one or more modules such as a source code control module 110, build module 112, and so forth. The source code control module 110 may be configured to provide control of source code, check-in/check-out of source code to users 102, and so forth. The build module 112 is configured to take associated source code and generate a build of the application 108. The application 108 as built comprises source code configured for execution on the host device. In some implementations the application 108 as built may include executable binaries, markup language applications, and so forth. In some implementations the users 102 may use the build server 106 to implement a continuous integration methodology of software development in which workspaces of the users 102 are merged frequently, such as several times per day.

The build server 106 may be configured to implement, or work in conjunction with systems implementing one or more of the Rational ClearCase family of tools from IBM Corp, the Hudson tool developed at least in part by Kohsuke Kawaguchi and available at hudson-ci.org, the Jenkins tool as forked from Hudson and promulgated by Kohsuke Kawaguchi which is available at jenkins-ci.org, Perforce from Perforce Software Inc. of Alameda, Calif., or GitHub from GitHub, Inc. of San Francisco, Calif.

The build server 106 is configured to couple to one or more networks 114. The networks 114 may include public networks such as the Internet, private networks such as an institutional and/or personal intranet, or some combination of private and public networks. The networks 114 may also include any type of wired and/or wireless network, including but not limited to local area networks (LANs), wide area networks (WANs), Wi-Fi, WiMax, and mobile communications networks (e.g. 3 G, 4 G, and so forth). The networks 114 may utilize communications protocols, including packet-based and/or datagram-based protocols such as internet protocol (IP), transmission control protocol (TCP), user datagram protocol (UDP), or other types of protocols.

A test server 116 may also couple to the one or more networks 114. Communication may be established between the build server 106 and the test server 116. The build server 106 is configured to generate and send a test package 118 to the test server 116. The test package 118 may comprise the application build, tests, configuration data, build information, and so forth. The build server may send the test package 118 using a uniform resource locator ("URL") which is associated with a particular account on the test server 116. The URL used by the build server 106 to send the test package 118 may be unique to a particular user 102, group of users 102, build server 106, entity, organization, and so forth.

The test server 116 comprises a test server API module 120 configured to accept and respond to the test package 118 sent by the build server 106. In one implementation, the test server API module 120 may implement a representational state transfer ("REST") responsive to data sent using a hypertext transfer protocol ("HTTP"). The exchange of information between the build server 106 and the test server 116 may be encrypted. For example, transfers of the test package 118 may use HTTP secure ("HTTPS").

As described above, the build server 106 may be configured to implement, or work in conjunction with, various systems to support development. In one implementation the build server 106 may implement a Hudson/Jenkins build server system with plugins configured to interface with the test server 116 using the test server API module 120. The plugins may allow for opening a specific host device 126 with an installed specific build of the application 108 as a post build option. The plugins may also allow for automated calls to the test server 116 to interact with particular builds.

In some implementations the test server 116 may be configured to work with various tools such as ClearCase, Jenkins, Hudson, Perforce, GitHub, and so forth. Similarly, the test server 116 and the services provided by the test server 116 may be configured to integrate with various software development kits ("SDKs"). For example, integration may be provided for SDKs promulgated by Sencha Inc. of Redwood City, Calif., PhoneGap by Adobe Systems of San Jose, Calif., AppGyver by AppGyver Inc. of San Francisco, Calif., Eclipse by the Eclipse Foundation of Ottawa, Ontario, and so forth. The test server 116, or portions thereof such as the test server API module 120, may be customized to allow for integration with particular users 102 or entities. Users 102 with appropriate access rights to these tools may able to make API calls to the test server 116 to allow for the selection of a particular application 108 for testing or other actions. The selection of the particular application 108 may be automated such that operation occurs without human intervention.

An unpack module 122 may be configured to unpack the test package 118. This unpacking may include one or more of separating out the executables, tests, configuration data, build information, and so forth.

A host device remote control module 124 is configured to couple to one or more host devices 126 in a host device farm 128. The host devices 126 may include smartphones, tablet computers, televisions, set-top boxes, in-vehicle computer systems, home entertainment systems, and so forth. The host device farm 128 may include different varieties of host devices 126. These varieties may reflect differences in hardware, software, configuration, and so forth. For example, the host device farm 128 may include host devices 126 from manufacturer "A", manufacturer "B", and so forth. Furthermore, these host devices 126 may be of different generations, capabilities, and so forth. Continuing the example, the host devices 126 from the manufacturer "A" may include tablet computers, smartphones, and so forth.

In some embodiments, the test server 116 may employ one or more input/output ("I/O") interfaces comprising an electrical or optical connection to couple to the one or more host devices 126 in the host device farm 128. In one embodiment, a universal serial bus ("USB") 2.0 or better connection may be used to communicatively couple the host device 126 to the test server 116. The USB connection may be used to transfer data from the host device 126 to the test server 116 or another test server 116, using TCP as a communication protocol. The data may include the application 108, testing applications, screenshots, test results, diagnostic data, and so forth.

The USB connection may support high speed data rates exceeding 400 Mb/sec and up to 480 Mb/sec, enabling a video stream from the host device 126 display to be provided to the test server 116 which is a high-fidelity representation of the images presented on the host device 126. Other implementations of USB, such as USB 3.0 and beyond may also be used. In other implementations other connections may be used, including but not limited to high-definition multimedia interface (HDMI), Institute of Electrical and Electronics Engineers ("IEEE") 1394 interface, Ethernet, external serial attachment interface ("eSATA"), and so forth.

The host device remote control module 124 is configured to send, using the I/O interface, one or more instructions to an input virtualization module executing on at least a portion of the one or more host devices 126 in the host device farm 128. The one or more instructions are configured to perform at least one input event on the one or more host devices 126 during the execution of the application 108.

The host device remote control module 124 may provide other instructions to the host device 126. For example, the instructions may initiate one or more test applications, diagnostic functions, and so forth on the host device 126, such as described below.

The host device remote control module 124 may also be configured to receive information from the one or more host devices 126. This information may include diagnostic output, testing outputs, screenshots of one or more of the displays of the one or more host devices 126, and so forth. The screenshots may be stored as still images, or combined to form a video stream representative of information presented on the display of the host device 126. The screenshots generated as the one or more host devices 126 execute the application 108 may be received by the test server 116 for analysis, presentation to the user 102, stored, and so forth.

Additional details on remote control of the host device 126 may be found in U.S. patent application Ser. No. 13/619,867, filed on Sep. 14, 2012, titled "Remote Control of a Mobile Device" to Manish Lachwani, et al. which is incorporated by reference into this disclosure.

A traffic modification module 130 is configured to modify communications between the host devices 126 and one or more external devices 132. The external devices 132 may include servers or other devices which are accessible using the one or more networks 114. As described above the networks 114 may include local or wide-area networks. The modification may be used to introduce into the testing environment of the application 108 conditions associated with different network conditions such as a particular carrier network, low signal strength, and so forth. The traffic modification module 130 may be configured with network profile data which comprises network profile parameters. The network profile parameters are configured to instruct the traffic modification module 130 to modify at least a portion of network traffic between one or more of the host devices 126 and the external devices 132.

Additional details on the traffic modification module 130 may be found in U.S. patent application Ser. No. 13/680,671, filed on Nov. 19, 2012, titled "Configurable Network Virtualization" to Manish Lachwani, et al. which is incorporated by reference into this disclosure.

An application validation module 134 may also be provided in the test server 116. The application validation module 134 is configured to use assembly code data generated during execution of the application 108 on the host device 126 to generate object level hierarchy data associated with the application 108. The object level hierarchy data indicates a hierarchical association between a plurality of objects, based on one or more determined parent-child relationships between the objects. In some embodiments, the application validation module 134 may iteratively request portions of the assembly code data to analyze address data for objects listed in the assembly code data, determine parent-child relationships among the objects, or generate one or more object level hierarchies based on the objects and their relationships. As used herein, address data describes addresses for locations in virtual memory on the device where the application 108 is executing. Address data may also describe addresses for locations in active memory or program memory on a device.

Object level hierarchies for different application builds may be compared to identify differences between them. For example, differences between the current version and the previous version may be identified. Embodiments may identify one or more of differences in the number or identity of objects in the hierarchy, differences in the relationships between the objects, or differences in one or more attributes associated with the objects. In this way, embodiments may identify regressions or bugs in a particular feature set of the application 108 through comparison of object level hierarchies generated for multiple versions of the application 108. Information associated with the object level hierarchy may also be used to confirm compliance with target character sets (e.g., for localization of the application).

Additional details on the application validation module 134 may be found in U.S. patent application Ser. No. 13/631,919, filed on Sep. 29, 2012, titled "Application Validation Through Object Level Hierarchy Analysis" to Manish Lachwani, et al. which is incorporated by reference into this disclosure.

The test server 116 may also incorporate an audit module 136. The audit module 136 is configured to analyze object data resulting from assembly code generated during execution of the application 108 on the host device 126 to identify objects which communicate with external devices 132 or services while executing on the host device 126. This analysis may reveal one or more security risks associated with execution of the application 108. Identification of security risks may indicate that the application 108 includes features that may lead to data corruption, data destruction, data theft, data leakage, or data intrusion on the host device 126 or on a networked device in communication with the host device 126, such as the external device 132.

Additional details on the audit module 136 may be found in U.S. patent application Ser. No. 13/655,667, filed on Oct. 19, 2012, titled "Application Auditing Through Object Level Code Inspection" to Manish Lachwani, et al. which is incorporated by reference into this disclosure.

A markup language/hybrid testing module 138 is configured to provide testing functionality associated with markup language applications or hybrid applications. Additional details on the markup language application and hybrid application testing may be found in U.S. patent application Ser. No. 13/721,632, filed on Dec. 20, 2012, titled "System for Testing Markup Language Applications" to Manish Lachwani, et al. which is incorporated by reference into this disclosure.

A test result module 140 is configured to generate test results 142 based at least in part on information provided by one or more of the host device remote control module 124, the traffic modification module 130, the application validation module 134, the audit module 136, and so forth. The test server API module 120 may be used to provide the test results 142 to the build server 106, the client devices 104, or both. In one implementation, the test results 142 may be expressed using extensible markup language ("XML"), JavaScript Object Notation, or both. For example, a view hierarchy of a user interface associated with the application 108 may be generated during testing. For example, rendering of the user interface of the application 108 may vary based on form factor of the host devices 126, build of the application 108, and so forth. The test result module 140 may be configured to provide test results 142 comprising view hierarchy information in an XML format for sending to the build server 106 or another device for analysis. In some implementations the test server API module 120 may be configured to allow for interaction elements of the view hierarchy. For example, the user 102 may use an API call to the test server API module 120 to interact with a specific UIView in the view hierarchy.

The build server 106 may receive the test results 142. The build server 106 may provide at least a portion of the test results 142, or information based at least in part on the test results 142, to the client devices 104 for presentation to the users 102. In some implementations the build module 112 may use information in the test results 142 to indicate portions of the application 108 which have passed or failed testing by the test server 116.

The modules of the build server 106, the test server 116, the host devices 126, and so forth are described in this disclosure as separate modules. In some implementations at least a portion of the functionality of these modules may be combined into a single module, or incorporated into another module.

Figure 2:
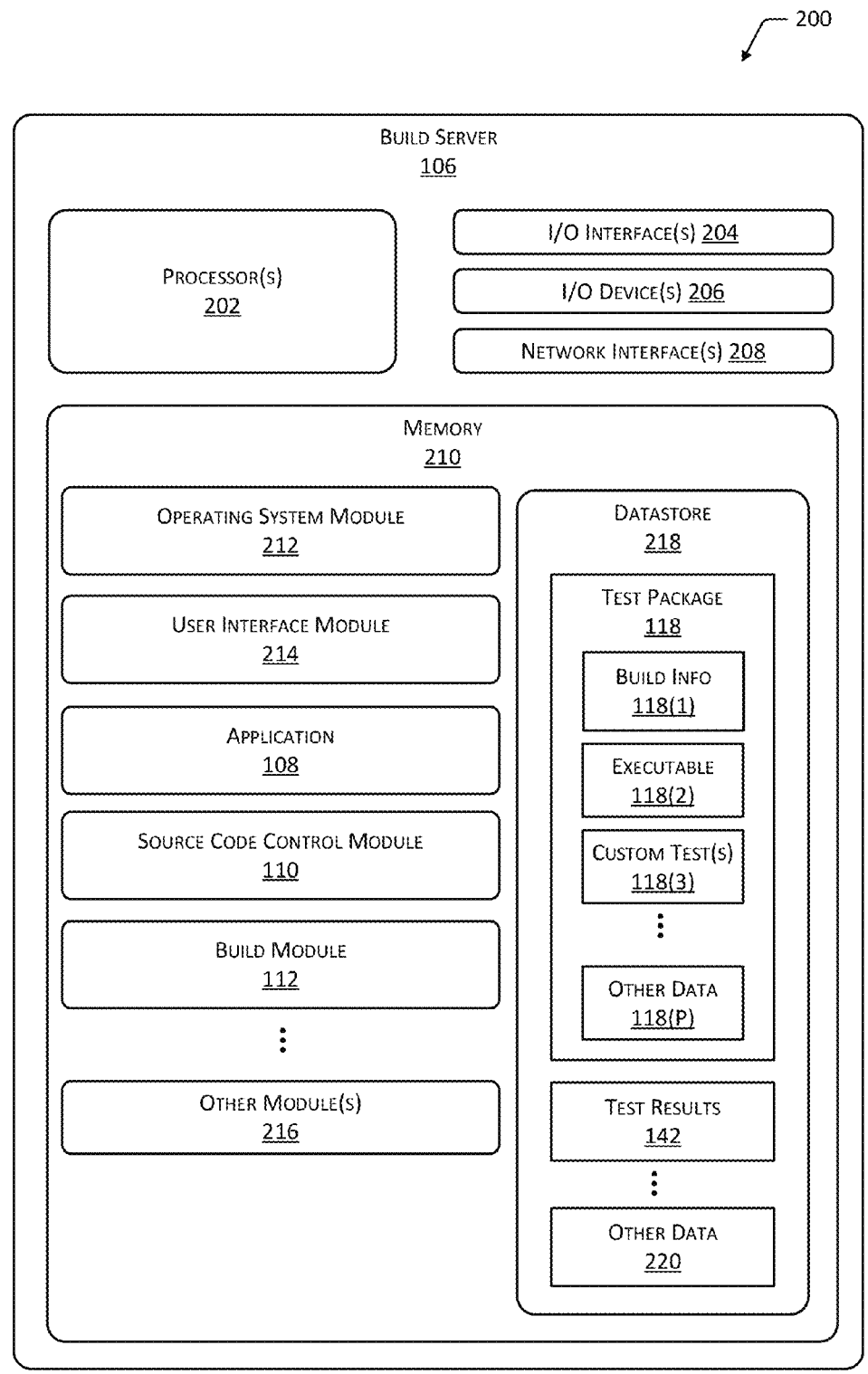
FIG. 2 depicts a block diagram of the build server configured to facilitate development of the application.

FIG. 2 depicts a block diagram 200 of the build server 106. The build server 106 may include one or more processors 202 configured to execute one or more stored instructions. The processors 202 may comprise one or more cores.

The build server 106 may include one or more input/output (I/O) interface(s) 204 to allow the build server 106 to communicate with other devices. The I/O interface(s) 204 may couple to one or more I/O devices 206. In some embodiments, the I/O device(s) 206 may be physically incorporated with the build server 106 or be externally placed.

The build server 106 may also include one or more network interfaces 208 to enable communications between the build server 106 and other networked devices. Such network interface(s) 208 may include one or more network interface controllers (NICs) or other types of transceiver devices configured to send and receive communications over the network(s) 114. For example, the network interface(s) 208 may be configured to provide a Wi-Fi connection compliant with one or more IEEE 802.11 standards such as 802.11g or 802.11n. The build server 106 may also include one or more busses or other internal communications hardware or software that allow for the transfer of data between the various modules and components of the build server 106.

The build server 106 includes one or more memories 210. The memory 210 comprises one or more computer-readable storage media ("CRSM"). The CRSM may be any one or more of an electronic storage medium, a magnetic storage medium, an optical storage medium, a quantum storage medium, a mechanical computer storage medium, and so forth. The memory 210 provides storage of computer readable instructions, data structures, program modules, and other data for the operation of the build server 106.

The memory 210 may include at least one operating system (OS) module 212. The OS module 212 is configured to manage hardware resources such as the I/O interface(s) 204 and network interface(s) 208, and to provide various services to applications or modules executing on the processor(s) 202.

The memory 210 may include a user interface module 214, the application 108, the source code control module 110, the build module 112, or other module(s) 216. The user interface module 214 is configured to provide a user interface to the one or more client devices 104. In some implementations the user interface may comprise a graphical user interface, and may be delivered as hypertext markup language ("HTML") data configured for presentation on the client devices 104.

In some implementations the functionality of the build server 106 may exist across one or more devices. For example, a first build server 106(1) may provide the user interface module 214 while a second build server 106(2) provides the source code control module 110, a third server 106(3) provides the build module 112, and so forth.

The memory 210 may also include a datastore 218 to store information for operations of the build server 106. The datastore 218 may comprise a database, array, structured list, tree, or other data structure. In some implementations, the datastore 218 may store the test package 118 before transmission to the test server 116, the test results 142 received from the test server 116, and so forth.

The test package 118 may include information including build information 118(1), executable files 118(2), custom tests 118(3), or other data 118(P) such as testing configuration data. The build information 118(1) may provide information indicative of libraries used, host devices 126 supported, build version number information, and so forth for a particular application build. For example, the build information 118(1) may indicate that the test package 118 includes build 5.13.1030.1 which is configured for execution on a particular computing device model from manufacturer "A". The executable files 118(2) may include executable binaries, markup language applications, and so forth, which are configured for execution on the host devices 126. The custom tests 118(3) comprise information indicative of tests, test scripts, designation portions of the application 108 to test, and so forth. For example, the user 102 may generate a custom test 118(3) to exercise particular functionality of the application 108. These custom tests 118(3) may comprise unit tests configured for use on the host devices 126 in the host device farm 128. For example, the custom tests 118(3) may include those developed in the OCUnit testing framework promulgated by sente.ch from Sen:te of Switzerland, Calabash as promulgated by lesspainful.com of Denmark, Frank as promulgated by testingwithfrank.com as associated with ThoughtWorks Inc. of Chicago, Ill. The test package 118 may include other data 118(P) such as user identification, account information, and so forth.

Other data 220 may also be stored, such as the API URL associated with the test server 116, historical test results, version information, code check-in/check-out information, build status, and so forth.

Figure 3:
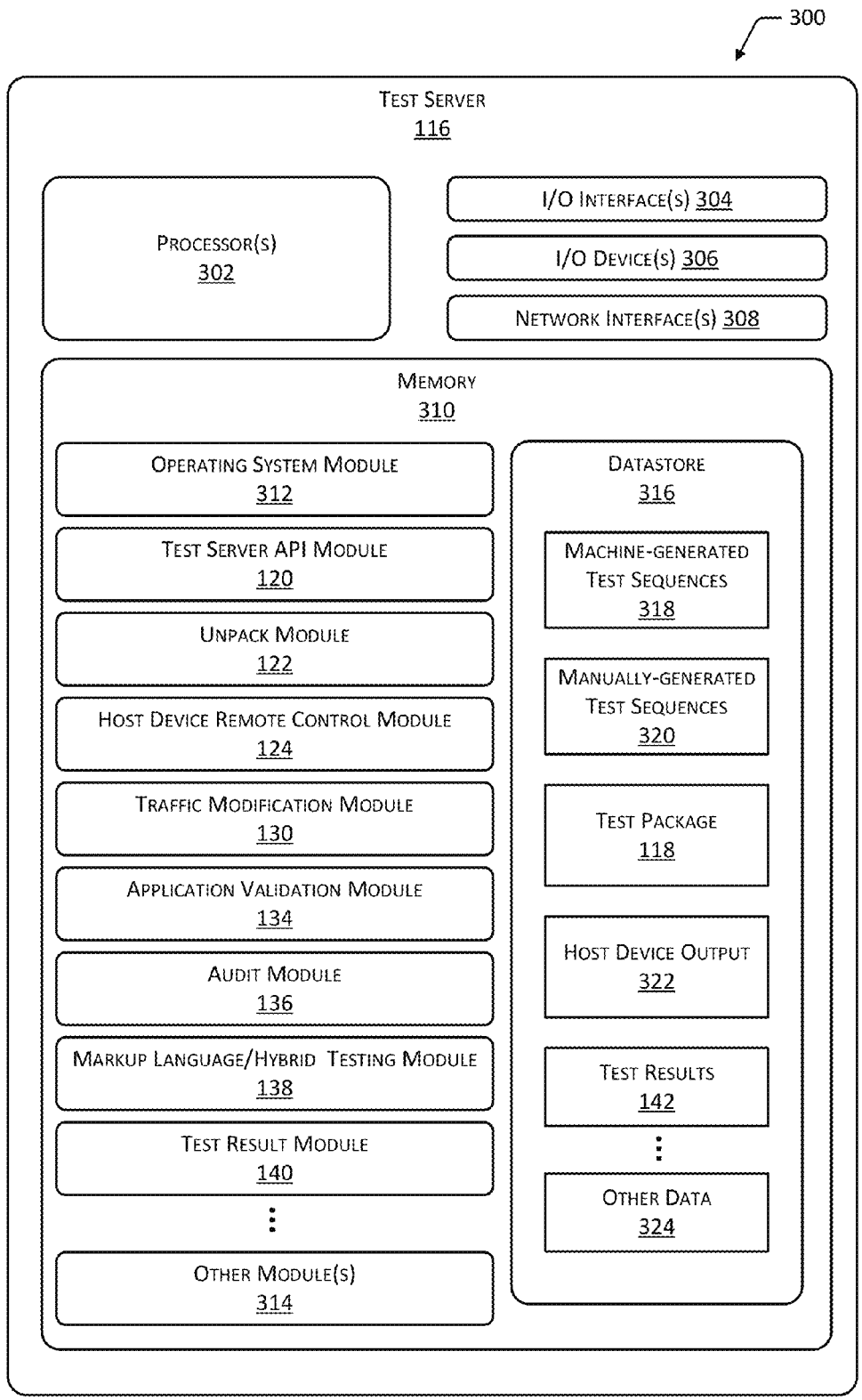
FIG. 3 depicts a block diagram of the test server configured to test the application on one or more remotely controlled host devices.

FIG. 3 depicts a block diagram 300 of the test server 116. The test server 116 may include one or more processors 302 configured to execute one or more stored instructions. The processors 302 may comprise one or more cores.

The test server 116 may include one or more I/O interface(s) 304 to allow the test server 116 to communicate with other devices. For example, the I/O interface(s) 304 may be configured to provide a universal serial bus (USB) connection to couple to the host device 126. The I/O interfaces 304 may also be known as "communication interfaces."

The I/O interface(s) 304 may couple to one or more I/O devices 306, such as described above. In some embodiments, the I/O device(s) 306 may be physically incorporated with the test server 116 or be externally placed.

The test server 116 may also include one or more network interfaces 308 to enable communications between the test server 116 and other networked devices such as those depicted in FIG. 1. Such network interface(s) 308 may include one or more NICs or other types of transceiver devices configured to send and receive communications over the network(s). For example, the network interface(s) 308 may be configured to provide a Wi-Fi connection compliant with one or more IEEE 802.11 standards such as 802.11g or 802.11n. The test server 116 may also include one or more busses or other internal communications hardware or software that allow for the transfer of data between the various modules and components of the test server 116.

The test server 116 includes one or more memories 310. The memory 310 comprises one or more CRSM as described above. The memory 310 provides storage of computer readable instructions, data structures, program modules, and other data for the operation of the test server 116.

The memory 310 may include at least one OS module 312. The OS module 312 is configured to manage hardware resources such as the I/O interface(s) 304 and network interface(s) 308, and to provide various services to applications or modules executing on the processor(s) 302.

The memory 310 may store one or more of the test server API module 120, the unpack module 122, the host device remote control module 124, the traffic modification module 130, the application validation module 134, the audit module 136, the test result module 140, and so forth.

The test server API module 120 is configured to accept and respond to the test package 118 or other information sent by the build server 106. The test server API module 120 may also be configured to send the test results 142 or other information to the build server 106. Use of the test server API module 120 allows the build server 106 to integrate the testing functionality of the test server 116 into the automated or semi-automated testing processes associated with the application build.

The unpack module 122 may be configured to unpack the test package 118. The unpacking may include one or more of separating out the application build, tests, configuration data, build information, and so forth. The unpack module 122 may also be configured to verify account information associated with the build server 106 and so forth.

As described above, the host device remote control module 124 is configured to allow the test server 116 to send instructions and data to the host devices 126, receive information from the host devices 126, and so forth. As also described above, the traffic modification module 130 is configured to modify communications between the host devices 126 and one or more external devices 132. The modification may be used to introduce into the testing environment of the application 108 conditions associated with different network conditions such as a particular carrier network, low signal strength, and so forth.

The memory 310 may also include the application validation module 134 configured to validate the object level hierarchy of the application 108 and so forth, as described above. The audit module 136 may be configured to analyze object data resulting from assembly code generated during execution of the application 108 on the host device 126. The analysis may identify objects in the application 108 which communicate with the external devices 132 or services while executing on the host device 126. The markup language/hybrid testing module 138 is configured to provide testing functionality associated with markup language applications or hybrid applications.

The test result module 140 is configured to generate test results 142 based at least in part on information provided by one or more of the host device remote control module 124, the traffic modification module 130, the application validation module 134, the audit module 136, and so forth.

Other modules 314 may also be stored in the memory 310. These may include an account billing module configured to bill for testing services, host device 126 management module for administering the host device farm 128, benchmarking module, service level agreement ("SLA") management module, and so forth.

The benchmarking module may be configured to gather performance benchmarks associated with the application 108. These performance benchmarks may include, but are not limited to load time, responsiveness to inputs, and so forth. The performance benchmarks may be measured across different devices, device configurations, or both which are available in the host device farm 128.

In one implementation, the benchmarking module may be configured to calculate load time metrics for applications 108, web sites, or both. The host devices 126 may be configured with different Internet browsers, layout rendering engines, JavaScript engines, and so forth. The benchmarking module may be configured to measure load time on the host device 126 of pages associated with a particular web site. For example, the load time of a root page of a web site designed for mobile users may be tested. The load time may also be recursively measured for child pages of the web site. Rendering time on the different host devices 126, or on different applications 108 such as Internet browsers on the host devices 126, may also be measured. For example, load times and rendering times for a particular application 108 and web site may be tested across several different Internet browsers for the same host device 126. As with the other modules, the functions of the benchmarking module may be automated, accessed using the test server API module 120, or both.

The SLA management module may be configured to provide a particular level of service as defined by one or more metrics. These metrics may include response times, diversity in host devices 126 used, and so forth. The SLA management module may coordinate and monitor operation of the test server 116 such that test results 142 are provided within a predetermined time. For example, a SLA may specify the test results 142 are to be returned within one hour. The SLA management module may prioritize processing of test packages 118 based on the SLA associated with the test package 118. For example, test packages 118 which have a SLA specifying a one hour response may be prioritized for testing over those test packages 118 with SLAs for eight hour response time.

The memory 310 may also include a datastore 316 to store information for operations of the test server 116. The datastore 316 may comprise a database, array, structured list, tree, or other data structure. The datastore 316 may store machine-generated test sequences 318, manually-generated test sequences 320, or both. The machine-generated test sequences 318 may be generated at least in part by automated processes which execute on the build server 106. For example, the test server 116 may automatically generate the machine-generated test sequences 318 to navigate through all user selectable options in the application 108. In comparison, the manually-generated test sequences 320 may be created by the user 102 or another party. The test sequences are configured to exercise particular functionality, portions of the code, user interface functionality, and so forth. The test sequences may comprise scripts, code, markup language, and so forth.

The datastore 316 may also include the test package 118 as received from the build server 106 using the test server API module 120. Host device output 322 may also be stored. The host device output 322 comprises information received from the host devices 126 in the host device farm 128. The host device output 322 is discussed in more detail below with regard to FIG. 4.

The test results 142 may also be stored in the datastore 316, along with other data 324. The other data 324 may include account information, billing preferences, test configurations, and so forth.

Figure 4:
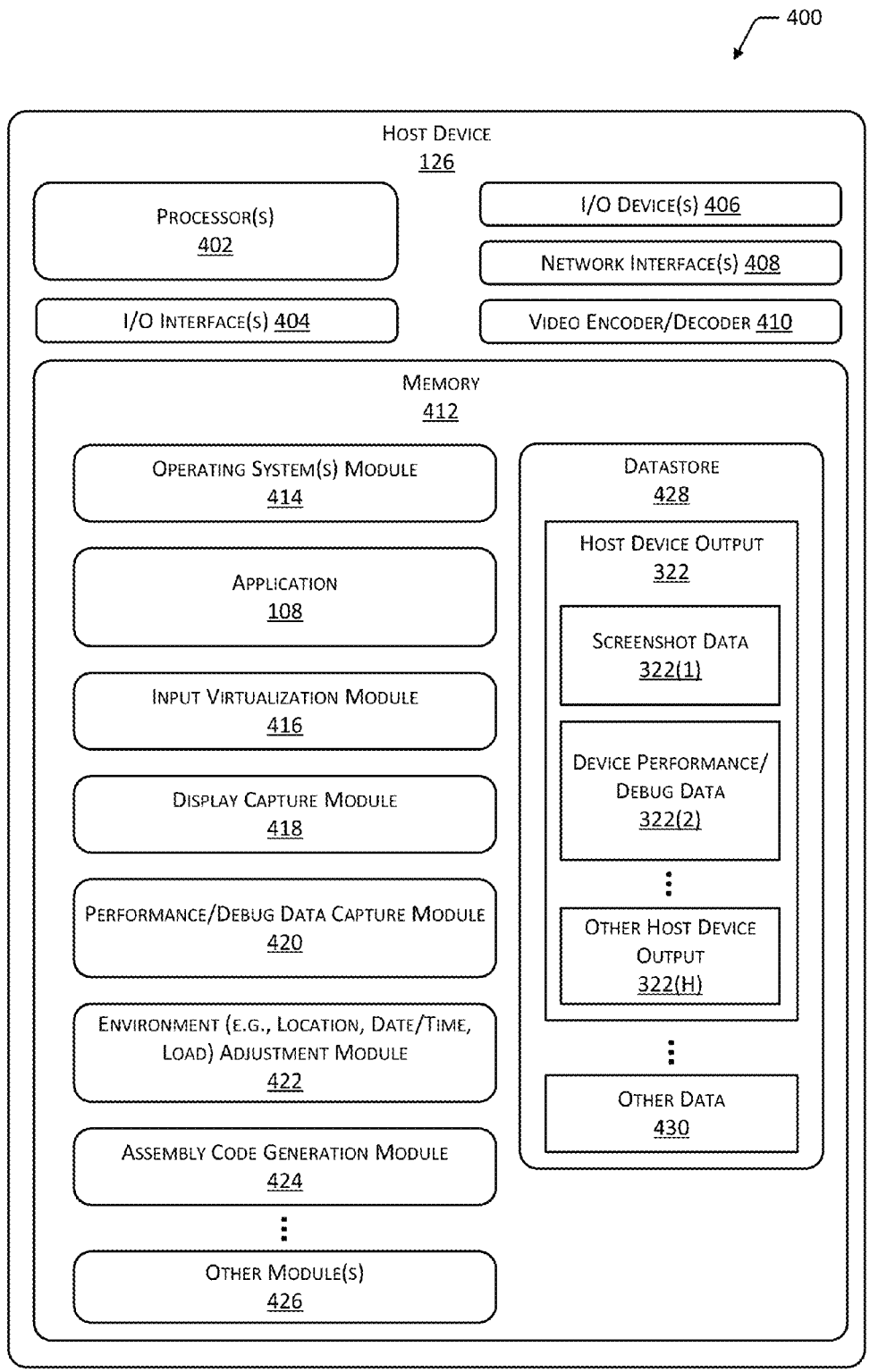
FIG. 4 depicts a block diagram of the host device remotely controlled by the test server.

FIG. 4 depicts a block diagram 400 of the host device 126. As described above, the host device farm 128 may be made up of one or more host devices 126 which may be used to test the application 108. The host device 126 may include one or more processors 402 configured to execute one or more stored instructions. The processors 402 may comprise one or more cores.

Similar to the devices described above, the host device 126 may include one or more I/O interface(s) 404 to allow the host device 126 to communicate with other devices. The I/O interface 404 may be configured to provide a USB connection.

The I/O interface 404 may couple to one or more I/O devices 406. The I/O devices 406 may include user input devices such as one or more of a keyboard, a mouse, a pen, a game controller, a voice input device, a touch input device, gestural input device, and so forth. The I/O devices 406 may include output devices such as one or more of a display, a printer, audio speakers, haptic output device, and so forth. In some embodiments, the I/O devices 406 may be physically incorporated with the host device 126 or be externally placed.

The host device 126 may also include one or more network interfaces 408 configured to send and receive communications over the one or more networks 114. The host device 126 may also include one or more busses or other internal communications hardware or software that allow for the transfer of data between the various modules and components of the host device 126.

The host device 126 may include a hardware-based video encoder/decoder 410. While a hardware-based video encoder/decoder is described, in some implementations a hardware-based video encoder may be used. The video encoder/decoder 410 may be incorporated into a common die with the one or more processors 402 or may be on a separate die. The video encoder/decoder 410 may be configured to enable the capture of screenshot data in the H.264 or MPEG-4 Part 10 compliant format.

The host device 126 includes one or more memories 412. The memory 412 comprises one or more CRSM, as described above. The memory 412 may include at least one operating system ("OS") module 414. The OS module 414 is configured to manage hardware resources such as the I/O interfaces 404 and provide various services to applications or modules executing on the one or more processors 402. The OS module 414 may comprise mobile operating systems configured for execution on mobile computing devices. The operating systems module 414 may implement one or more of iOS® from Apple Corp. of Cupertino, Calif.; Windows Mobile® from Microsoft Corp. of Redmond, Wash.; Android® from Google, Corp. of Mountain View, Calif. and its derivatives from various sources; Palm OS® from Palm Computing, Inc. of Sunnyvale, Calif. and its derivatives from various sources, BlackBerry OS® from Research In Motion Ltd. of Waterloo, Ontario, Canada; or other operating systems such as VxWorks from Wind River Systems of Alameda, Calif.

The memory 412 may also include one or more of the application 108, an input virtualization module 416, a display capture module 418, a performance/debug data capture module 420, an environment adjustment module 422, an assembly code generation module 424, or other modules 426.

The application 108 is configured to execute on the host device 126. For example, this may be the application 108 in the test package 118 received from the build server 106.

The input virtualization module 416 is configured to virtually execute input events. These input events may be received as instructions from the host device remote control module 124.

The display capture module 418 is configured to capture screenshots of the host device 126 display and generate screenshot data 322(1). The screenshot data 322(1) may be generated using the hardware-based video encoder/decoder 410. Use of the hardware-based video encoder/decoder 410 allows for the high-fidelity capture and presentation of images presented on the display of the host device 126. This high-fidelity is based on the ability to capture the screenshots at the full resolution and at the full frame rate or redraw rate of the display.

The performance/debug data capture module 420 is configured to capture one or more of: performance data about the host device 126, code-level debug data for apps or other processes running on the host device 126, and so forth. The information may be provided to the build server 106, the user 102, or both.

The environment adjustment module 422 is configured to adjust the host device 126 environment based on input from the test server 116. The environment includes OS, OS version, firmware, firmware version, language in use, date, time, location/position, orientation, and so forth.

The environment adjustment module 422 may modify the location of the host device 126 such that processes running on the host device 126 behave as though the host device were located in a location other than its actual, physical location. For example, the host device 126 may be located in a test facility in San Francisco, Calif., but the OS module 414 of the host device 126 or other applications may report a location of London, England.

The environment adjustment module 422 may also generate loads on the one or more processors 402, memory 412, I/O devices 406, or a combination thereof. For example, the environment adjustment module 422 may be configured to execute an application 108 which consumes 50% of the processor 402 resources and uses enough memory 412 to result in a low-memory state in the OS module 414. The application 108 may then be executed, and tested under these loaded conditions. In some implementations, the user 102 may use a user interface on the client device 104 to remotely control the host device 126 in real-time to check for responsiveness, behavior, and so forth.

The assembly code generation module 424 is configured to generate assembly code for the application 108 during execution. In some implementations the assembly code generation module 424 may comprise a debugger.

The other modules 426 may also be included in the host device 126. These other modules 426 may include, but are not limited to, other application modules not under test.

The memory 412 also includes a datastore 428 to store information for operations of host device 126. The datastore 428 may comprise a database, array, structured list, tree, or other data structure. The datastore 428 may store the host device output 322, which may comprise the screenshot data 322(1) generated by the display capture module 418. The screenshot data 322(1) may be stored until such data is retrieved from the host device 126 by the test server 116 or overwritten by the display capture module 418. The host device output 322 may also include device performance and/or debug data 322(2) gathered by performance/debug data capture module 420. As above, the data 322(2) may be stored until retrieved by the test server 116. Other host device output 322(H) may also be stored. Other data 430 may also be stored in the datastore 428.

Figure 5:
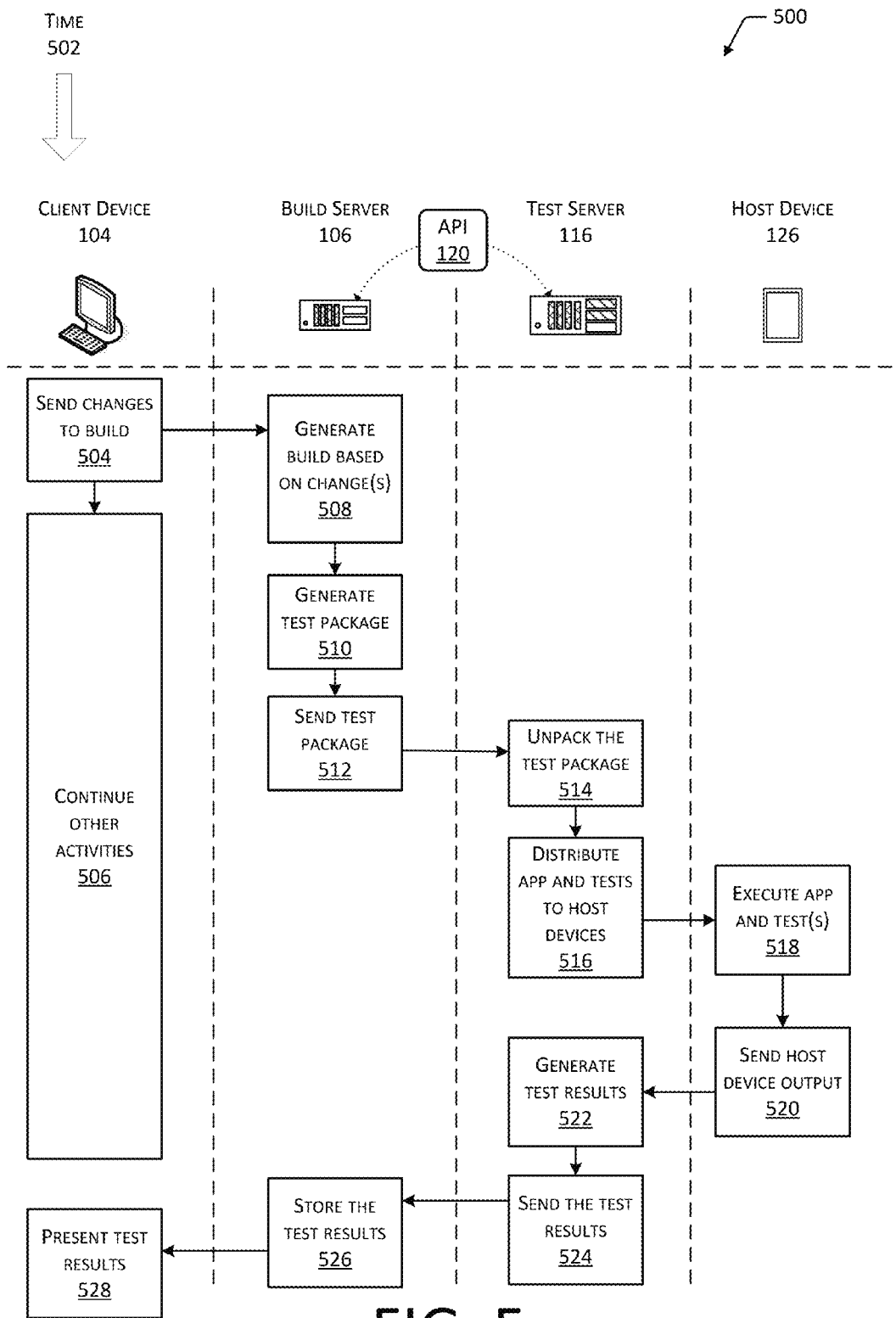
FIG. 5 illustrates operations performed by the various devices in the system for testing the application on the remotely controlled host devices.

FIG. 5 illustrates operations 500 performed by the various devices in the system 100 for testing the application 108 on the remotely controlled host devices 126 in the host device farm 128. In this illustration, time increases down the page as indicated by the arrow 502.

The client device 104 sends changes to the application build to the build server 106. For example, the user 102 may have changed some of the source code in the application 108 during development and checked-in those changes into the source code control module 110. After sending the changes 504, the client device 104 may continue on with other activities 506. For example, the user 102 may check email, continue development on the application 108, and so forth.

The build server 106 receives the changes from the client device 104. At 508, the build server 106 generates an application build which may include the changes as checked-in. The application build is configured for execution on one or more of the host devices 126. For example, the application 108 may be configured to execute on a tablet computer from Manufacturer "A". The application build may be for the complete application 108, or for particular modules or portions of the application 108 which are to be tested.

At 510, the build server 106 generates the test package 118. As described above, the test package 118 may comprise the build information 118(1), one or more executable files 118(2), custom tests 118(3), testing configuration data, and so forth. At 512, the test package 118 is sent to the test server 116. The sending may be facilitated using the test server API module 120. For example, the build server 106 may access the API URL which is unique to the entity operating the build server 106. The build server 106 may send using HTTPS the test package 118 to the test server 116 using the URL associated with the entity.

At 514, the test server 116 unpacks the test package 118. For example, the test server 116 may extract and separate the build information 118(1), the executable files 118(2), and so forth for processing. At 516, the test server 116 distributes the application 108 and associated tests to the host devices 126 in the host device farm 128. In some implementations, the unpacking may be based at least in part on the URL which was used to transfer the test package 118. For example, a particular URL may be associated with tests configured for a particular entity, or group within the entity. As described above, the test server 116 may use the I/O interface 304, such as the USB interface, to exchange information with the host device 126.

At 518 the host device 126 executes the application 108 and associated tests. The execution may include processing instructions from the host device remote control module 124 with the input virtualization module 416 to simulate user input on the host device 126. The execution may also include use the assembly code generation module 424 to produce assembly code associated with the executing application 108. In some embodiments, the assembly code generation module 424 may be a debugger such as the GNU debugger (gdb), or may include at least a portion of the functionality of a debugger. However, embodiments are not so limited, and any type of the assembly code generation module 424 may be employed to generate the assembly code data for an application.

At 520, the host device output 322 is sent from the host device 126 to the test server 116. The test server 116 receives the host device output 322 and generates the test results 142 based at least in part on the host device output 322. As described above, the test results 142 may comprise information expressed as XML, JSON, or both.

At 526, the build server 106 receives and stores the test results 142. The build server 106 may then provide the test results 142, or information based at least in part thereon, to the client device 104 for presentation to the user 102 as shown at 528. For example, the client device 104 may use a web browser application to present at least a portion of the test results 142 to the user 102.

Figure 6:
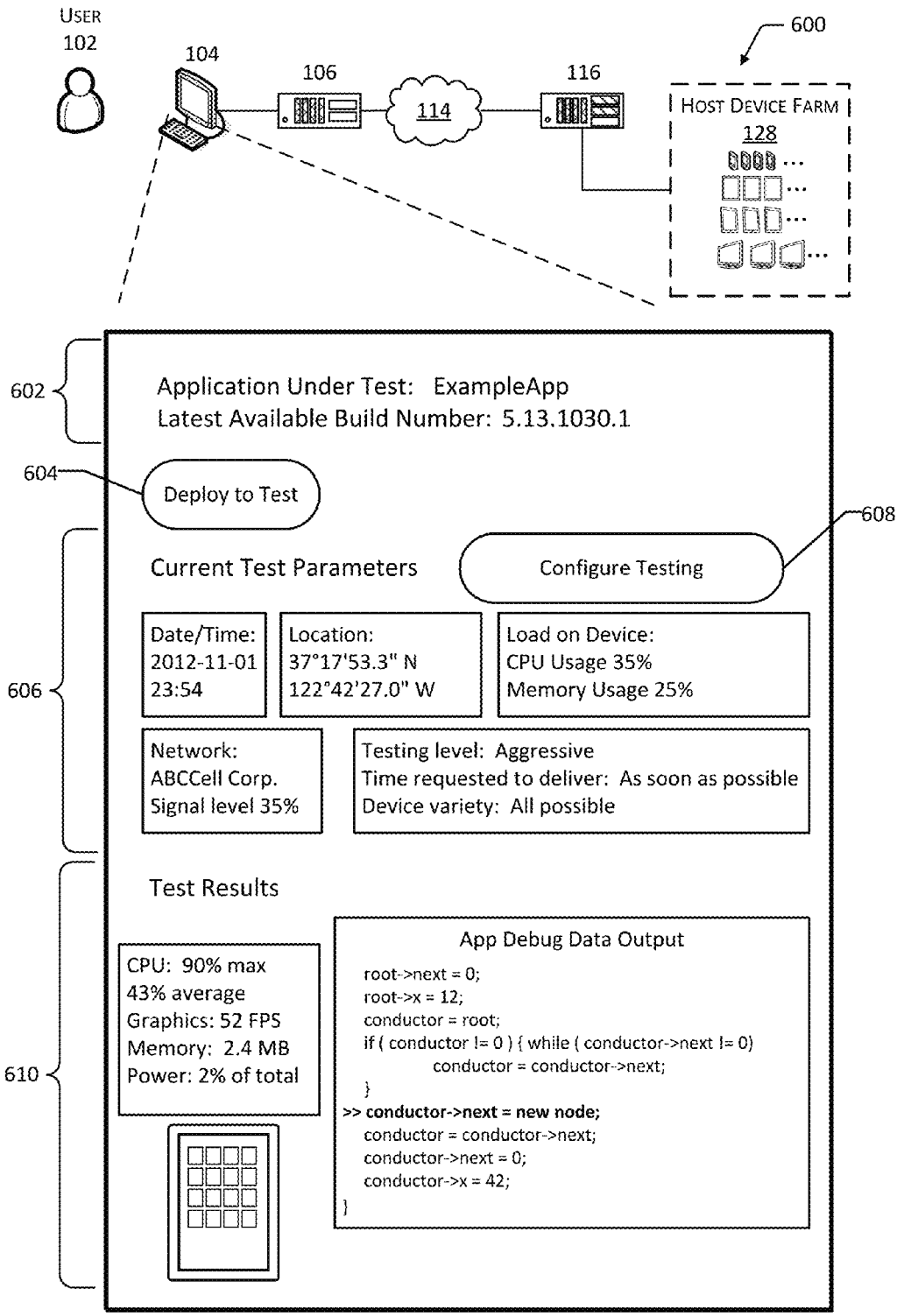
FIG. 6 depicts a user interface of testing options and results which may be presented to a user.

FIG. 6 depicts a user interface 600 of testing options and results which may be presented to the user 102. The interface 600 may comprise a web interface suitable for viewing within a web browser running on the client device 104 of the user 102. In some implementations, the data provided by the interface 600 may be copied into a file and reported to a user 102 in the file, in an email, or through other means. For example, the object data, the audit result data, the screenshots 322(1), and so forth may be provided to the client device 104. The data provided by the interface 600 may be stored in a file or other data format or structure, and provided to the user 102 or to a process in response to a request.

The interface 600 may include a summary section 602, describing characteristics of the application build. For example, as shown here it may indicate the name of the application 108 "ExampleApp" and the current build number "5.13.1030.1".

A deploy-to-test control 604 may be presented. The control 604 is configured to, on activation, generate and send the test package 118 to the test server 116 for testing without further intervention by the user 102. In some implementations the generation and sending of the test package 118 may be initiated automatically, such as at a pre-determined time, upon check-in of all portions of the application 108, upon completion of a process, and so forth.

A current test parameter section 606 provides information about the current configuration of the tests to be completed. For example, the test parameters may specify particular date and time, geographic location, CPU loading and memory usage to be used during testing, and so forth. Information about the network profile parameters to be used by the traffic modification module 130 may also be specified. For example, as shown here the wireless wide area network is set to provide an environment representative of service from "ABCCell Corp." with a signal level as received at the host device 126 of 35%.

The current test parameter section 606 may also provide information such as what tests are to be run, time frame to provide results, how to apply those tests, and so forth. For example, as shown here the testing level is set to "aggressive" in which all available tests will be scheduled to run against the application 108. The user may specify a time requested to deliver, such as "as soon as possible," "reduced cost," and so forth. For example, the "as soon as possible" may prioritize and conduct tests for the application 108 ahead of other applications which have selected the "reduced cost" option. The "reduced cost" option may thus be offered at a lower cost relative to the "as soon as possible" option given the potential delay in providing the test results 142. Host device 126 variety may also be specified, enabling the application 108 to be tested against all available devices compatible with the application 108, against a certain model, and so forth. This allows for testing to be conducted easily and quickly with several models of the host device 126. For example, the host device farm 128 may include legacy host devices 126 which are no longer available for purchase, or pre-release models of a next-generation host device 126 to allow for advance testing.

A configure testing control 608 may be presented. The configure testing control 608 is configured to, on activation, provide for modification of one or more of the test parameters.

In one implementation, activation of the configure testing control 608 may present a user interface allowing the user 102 to change the test parameters. For example, the user 102 may select options to enable debug options which provide details on UIView.

A test results section 610 provides information based at least in part on the test results 142 as received from the test server 116. The information may include screenshot data 322(1), device performance/debut data 322(2), and so forth. For example, the user 102 may watch a stream of video taken during a portion of the testing of the application on the one or more host devices 126 to observe behavior during testing. Other information such as UIView details, a portion of a UI layout hierarchy dump, application load times, web site load times, and so forth may also be presented.

The output of the test results 142 may be configurable to meet the specific requirements of particular users 102. For example, one user 102(1) may request reports to be provided as XML data while another user 102(2) may request reports to be delivered as JSON data.

Figure 7:
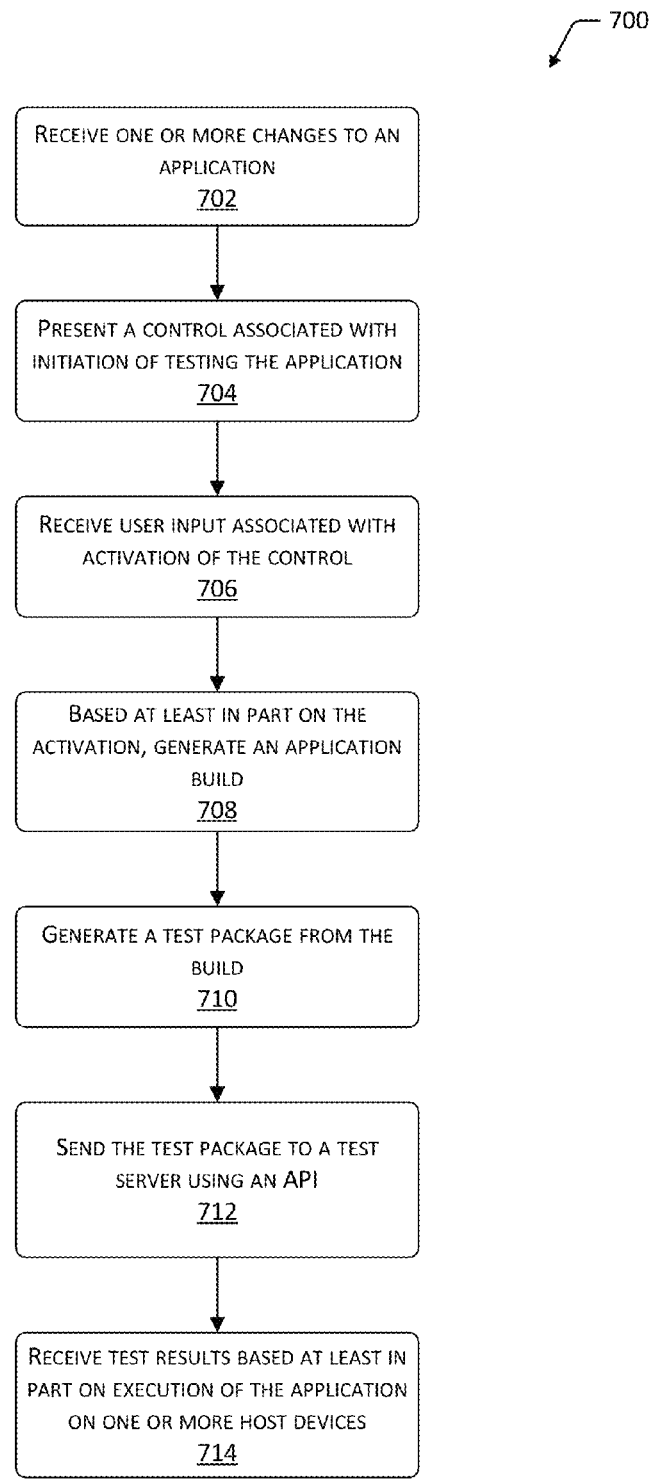
FIG. 7 depicts a flow diagram of a process on the build server to send the application for testing on the one or more host devices.

FIG. 7 depicts a flow diagram 700 of a process on the build server 106 to send the application 108 for testing on the one or more host devices 126. In some implementations this process may be distributed across a plurality of servers or other devices.

Block 702 receives one or more changes to an application 108. For example, the user 102 may check-in a portion of code for the application 108 which has been modified or added.

Block 704 presents a control associated with initiation of testing the application 108. This control may comprise a button or other user interface element presented within a graphical user interface, a particular spoken phrase in an audible user interface, and so forth. For example, in one implementation the control may comprise the deploy-to-test control 604 described above in FIG. 6.

Block 706 receives user input associated with activation of the control. For example, the user input may comprise a mouse click to select the deploy-to-test control 604, or utterance of the particular spoken phrase.

In some implementations, based at least in part on the activation of the control, block 708 generates a build of the application 108. In other implementations, the built application 108 may be available before the activation of the control. As described above, the application 108 may comprise executable code configured for execution on the one or more host devices 126.

Based at least in part on the activation of the control, block 710 generates a test package 118. As described above, the test package 118 may comprise at least a portion of the application 108. In some implementations the test package 118 may include source code of the application 108, while in other implementations the test package 118 may omit source code.

Block 712 sends the test package to the test server 116. As described above, the test server 116 is configured to perform one or more tests on one or more host devices 126. These tests may be performed for at least a portion of the application 108. For example, the testing may be for a particular part of the user interface in the application 108, or may be for all user interfaces and functions in the application 108. In one implementation, the sending may occur as a transaction implementing a representational state transfer ("REST") using HTTP with the test server API module 120.

As described above, the one or more tests may be executed contemporaneously across a plurality of the one or more host devices 126. For example, one-hundred different tests may be executed simultaneously on one-hundred different host devices 126. In one implementation at least a portion of the one or more host devices 126 configured to test the application 108 may differ from one another by one or more of: make, model, form factor, input devices, or output devices. In another implementation, at least a portion of the one or more host devices 126 configured to test the application 108 may differ from one another by one or more of: operating system version, installed applications, reported geographic location, apparent network connectivity, or memory usage. For example, the host devices 126 may be configured to report during testing a geographic location which differs from their actual location in a facility housing the host device farm 128. In another example, the traffic modification module 130 may modify traffic such that the host device 126 appears to be connected to a particular network service provider with a particular signal strength and data loss.

Block 714 receives test results 142 from the test server 116. As described above, the test results 142 may be expressed as XML, JSON, or a combination thereof.

Figure 8:
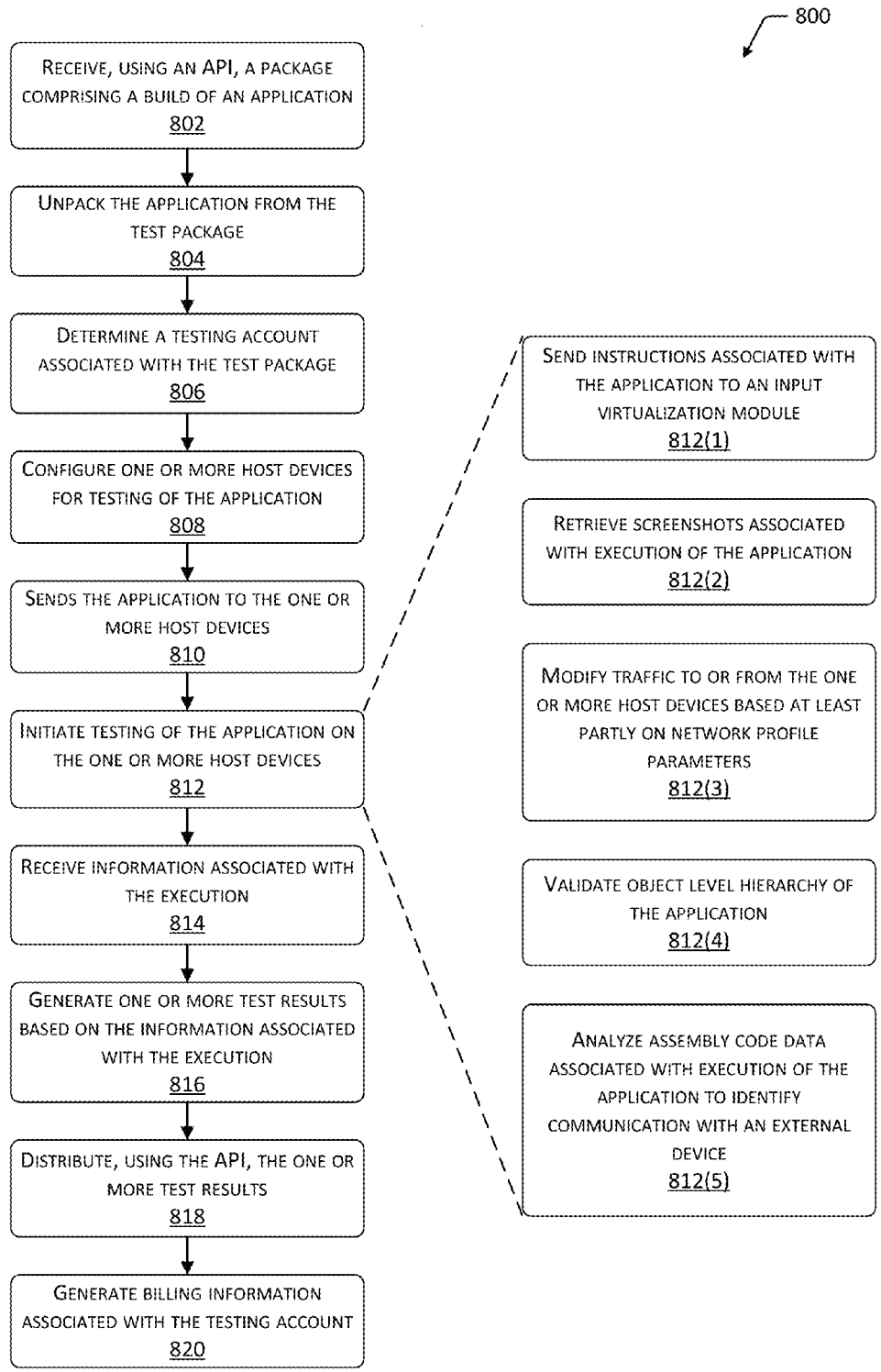
FIG. 8 depicts a flow diagram of a process on the test server to test the application on the one or more host devices.

FIG. 8 depicts a flow diagram 800 of a process on the test server 116, to test the application 108 on the one or more host devices 126. In some implementations this process may be distributed across a plurality of servers or other devices.

Block 802 receives a test package 118. As described above, the test package 118 may comprise a build of the application 108. The build may include build info 118(1), one or more executable files 118(2), custom tests 118(3), and so forth. The test package 118 is received with the network interface 308 using the test server API module 120.

Block 804 unpacks the application 108 from the test package 118. This unpacking may include decompression, separating out the executables, tests, and so forth.

Block 806 determines a testing account associated with the test package 118. In one implementation, the test package 118 may include an account identification number, account credentials and so forth. The testing account may be used to select particular test configuration parameters, bill for testing services, and so forth.

Block 808 configures one or more host devices 126 to test the application 108. As described, above, this configuration may use one of the I/O interfaces 304, such as the USB I/O interface coupled to the host devices 126.

Block 810 sends at least a portion of the application 108 to one or more of the host devices 126. As described above, the sending may use the I/O interface 304.

Block 812 initiates testing and execution of the application 108 on the one or more host devices 126. For example, instructions may be sent to execute the device, provide for simulated user input, and so forth. The testing may involve the use of a portion of the host devices 126 available in the host device farm 128. For example, application 108(1) may be tested on host devices 126(1)-126(313) while application 108(2) is tested on host devices 126(314)-126(511).

Block 812(1) may provide testing using the input virtualization module 416. As described above, the host device remote control module 124 may send, using the I/O interface 406, one or more instructions to the input virtualization module 416 which is executing on the one or more host devices 126. The one or more instructions are configured to perform at least one input event on the one or more host devices 126 during the execution of the application 108.

Block 812(2) may provide testing functionality of retrieving screenshot data 322(1) associated with the execution of the application 108 from at least a portion of the one or more host devices 126 used during testing. A plurality of screenshot data 322(1) of a display of the one or more host devices 126, generated by the display capture module 418 as the one or more host devices 126 execute the application 108, are retrieved using the I/O interface 404. This screenshot data 322(1) may be provided as still images, or as a stream of video. As described above, the screenshot data 322(1) may be processed at least partly by the hardware-based video encoders 410 of the one or more host devices 126.

Block 812(3) provides testing functionality of modifying traffic to or from the one or more host devices 126 and the external devices 132. The traffic may comprise packets of data. This functionality may be provided by the traffic modification module 130 as described above.

In one implementation, the testing may include receiving an indication of a first network profile to be applied to network traffic between at least a portion of the one or more host devices 126 and the external device 132, such as a server device. The first network profile may include a first set of network profile parameters which specify how the traffic is to be modified. The traffic modification module 130 receives a plurality of packets included in the network traffic sent from the one or more host devices 126 and addressed to the external device 132. The traffic modification module 130 may then modify at least one of the plurality of packets, based at least in part on the first set of network profile parameters. The modified plurality of packets is then sent to the external device 132.

In another implementation, the testing may include receiving an indication of a second network profile to be applied to the network traffic. The second network profile includes a second set of network profile parameters that at least partly differ from the first set of network profile parameters. The second network profile may be used to modify at least another one of the plurality of packets, based at least partly on the second set of network profile parameters. This modification may be to packets sent from the external device 132 to the host device 126. The modification of the at least another one of the plurality of packets may be performed after the modification of the at least one of the plurality of packets.

Block 812(4) may provide testing to validate the object level hierarchy of the application 108. This block may be configured to receive assembly code generated from execution of an application 108 on the host device 126. The assembly code is analyzed to identify a plurality of objects associated with the application 108 and to determine at least one relationship between the plurality of objects. Based on the plurality of objects and the at least one relationship, an object level hierarchy for the application is generated. The application may then be validated based at least in part on the object level hierarchy.

Block 812(5) provides testing by analyzing assembly code data generated during execution of the application 108 to identify at least one communication between the application 108 and the external device 132. An assembly code generation module 424 may be executed on at least a portion of the one or more host devices 126 to generate the assembly code data associated with the executing application 108.

The testing of 812 may use the techniques and functions available from the markup language/hybrid testing module 138, as described above. For example, where the application 108 comprises a hybrid application portions may be tested using embedded test tools in a layout engine module executing on the host devices 126.

Block 814 receives, using the I/O interface 304, information associated with the execution. This information may comprise host device 126 output 322 such as screenshot data 322(1), device performance/debug data 322(2), and so forth.

Block 816 generates one or more test results 142 based at least in part on the information associated with the execution. For example, the test results 142 may use the device performance/debug data 322(2) to determine a number of frames per second ("FPS") at which the display was updated during execution of the application 108.

Block 818 distributes the one or more test results 142 to another device, such as the build server 106. This distribution may include sending the test results 142 using the test server API module 120 and the network interface 308. In one implementation, the test results 142 may comprise information expressed as XML, JSON, or both.

Block 820 generates billing information associated with the testing account. The billing information may be based on resources used by the test server 116 during testing, flat fee, tiered pricing, and so forth.

Those having ordinary skill in the art will readily recognize that certain steps or operations illustrated in the figures above can be eliminated, combined, subdivided, executed in parallel, or taken in an alternate order. Moreover, the methods described above may be implemented as one or more software programs for a computer system and are encoded in a computer-readable storage medium as instructions executable on one or more processors.

Separate instances of these programs can be executed on or distributed across separate computer systems. Thus, although certain steps have been described as being performed by certain devices, software programs, processes, or entities, this need not be the case and a variety of alternative implementations will be understood by those having ordinary skill in the art.

Additionally, those having ordinary skill in the art readily recognize that the techniques described above can be utilized in a variety of devices, environments, and situations. Although the present disclosure is written with respect to specific embodiments and implementations, various changes and modifications may be suggested to one skilled in the art and it is intended that the present disclosure encompass such changes and modifications that fall within the scope of the appended claims.

The invention claimed is:

1. A system comprising:
at least one processor; and
at least one memory coupled to the at least one processor and storing instructions configured for execution on the at least one processor, the instructions configured to:
receive a test package comprising an application;
configure one or more host devices to test the application;
send the application to one or more of the host devices;
initiate testing and execution of the application on the one or more host devices, wherein the testing comprises instructions to:
receive an indication of a first network profile of a plurality of network profiles to be applied to network traffic between at least a portion of the one or more host devices and a network device, the first network profile including a first set of network profile parameters associated with a particular service provider;
receive a plurality of packets included in the network traffic sent from the one or more host devices and addressed to the network device;
modify at least one of the plurality of packets to introduce conditions associated with the particular service provider based at least on the first set of network profile parameters;
send the modified plurality of packets to the network device;

execute an assembly code generation module on at least one of the one or more host devices to generate assembly code data associated with the application;

analyze the assembly code data generated during execution of the application to identify at least one communication of the application;

receive information associated with the execution;

generate one or more test results based at least in part on the information associated with the execution; and distribute the one or more test results.

2. The system of claim 1, the testing comprising instructions configured to:

send one or more instructions to an input virtualization module executing on at least a portion of the one or more host devices, wherein the one or more instructions perform at least one input event on the one or more host devices during the execution of the application.

3. The system of claim 1, the testing comprising instructions configured to:

retrieve, from at least a portion of the one or more host devices, a plurality of screenshots of a display of the one or more host devices generated as the one or more host devices execute the application.

4. The system of claim 1, the testing comprising instructions to:

receive an indication of a second network profile of the plurality of network profiles to be applied to the network traffic, the second network profile including a second set of network profile parameters that differ from the first set of network profile parameters; and modify at least another one of the plurality of packets, based at least in part on the second set of network profile parameters, wherein the modification of the at least another one of the plurality of packets is performed after the modification of the at least one of the plurality of packets.

5. The system of claim 1, further comprising instructions to:

receive assembly code generated from execution of an application on a host device;

analyze the assembly code to identify a plurality of objects associated with the application and to determine at least one relationship between the plurality of objects;

based on the plurality of objects and the at least one relationship, generate an object level hierarchy for the application; and validate the application based at least in part on the object level hierarchy.

6. The system of claim 1, wherein the API implements a representational state transfer, and the test results comprise information expressed as extensible markup language ("XML"), JavaScript Object Notation ("JSON"), or both.

7. The system of claim 1, wherein modifying the at least one of the plurality of packets comprises modifying the at least one of the plurality of packets such that a host device appears to be connected to the particular service provider with a pre-determined signal strength.

8. A method of initiating testing of an application comprising:

presenting a control associated with initiation of testing the application;

receiving an activation of the control;

based at least in part on the activation of the control, generating a test package comprising at least a portion of the application; and sending the test package to a test server, wherein the test server is configured to perform one or more tests on one or more host devices of the at least a portion of the application, wherein the one or more tests comprise at least one test for:

receiving an indication of a first network profile to be applied to network traffic between at least a portion of the one or more host devices and a network device, the first network profile including a first set of network profile parameters associated with a particular service provider;

receiving a plurality of packets included in the network traffic sent from the one or more host devices and addressed to the network device;

modifying at least one of the plurality of packets to introduce conditions associated with the particular service provider based at least on the first set of network profile parameters;

sending the modified plurality of packets to the network device;

executing an assembly code generation module on at least one of the one or more host devices to generate assembly code data associated with the application; and analyzing the assembly code data generated during execution of the application to identify at least one communication of the application.

9. The method of claim 8, further comprising receiving test results from the test server, wherein the test results are expressed as extensible markup language ("XML"), JavaScript Object Notation ("JSON"), or both.

10. The method of claim 8, the sending comprising a transaction implementing a representational state transfer ("REST").

11. The method of claim 8, the application comprising executable code configured for execution on the one or more host devices.

12. The method of claim 8, wherein the control comprises a button presented in a graphical user interface and the activation of the control comprises selection of the button.

13. The method of claim 8, wherein the one or more host devices comprise one or more smartphones, tablet computers, or portable media players.

14. The method of claim 8, wherein the one or more tests are executed contemporaneously across a plurality of the one or more host devices.

15. The method of claim 8, further wherein at least a portion of the one or more host devices configured to test the application differ by one or more of: make, model, form factor, input devices, or output devices.

16. The method of claim 8, further wherein at least a portion of the one or more host devices configured to test the application differ from one another by one or more of: operating system version, installed applications, reported geographic location, apparent network connectivity, or memory usage.

17. A method comprising:

determining completion of an application, the application comprising executable code configured for execution on one or more host devices;

based at least in part on the completion of the application, generating a test package comprising at least a portion of the application; and sending the test package to a test server, wherein the test server is configured to perform one or more tests on one or more host devices of the at least a portion of the application, wherein the one or more tests comprise at least one test for:
- receiving an indication of a first network profile to be applied to network traffic between at least a portion of the one or more host devices and a network device, the first network profile including a first set of network profile parameters associated with a particular service provider;
- receiving a plurality of packets included in the network traffic sent from the one or more host devices and addressed to the network device;
- modifying at least one of the plurality of packets to introduce conditions associated with the particular service provider, based at least on the first set of network profile parameters;
- sending the modified plurality of packets to the network device;
- receiving assembly code generated from execution of the application;
- analyzing the assembly code to identify a plurality of objects associated with the application and to determine at least one relationship between the plurality of objects;
- based on the plurality of objects and the at least one relationship, generating an object level hierarchy for the application; and
- validating the application based at least in part on the object level hierarchy.

18. The method of claim 17, the determining completion comprising receiving an indication of completion of compilation of source code into one or more files configured for execution on the one or more host devices.

19. The method of claim 17, the sending comprising a hypertext transfer protocol ("HTTP") request to an application programming interface ("API") of the test server configured to accept the HTTP request.

20. The method of claim 17, wherein the one or more tests further include at least one test of:
- a test comprising remotely controlling a particular host device;
- a test comprising retrieving, from the one or more host devices, screenshots of a display of the particular host device generated during testing;
- a test comprising modifying one or more packets associated with the application during execution and sent by the particular host device; and
- a test comprising modifying one or more packets associated with the application received by the particular host device.

21. The method of claim 17, wherein the one or more tests further comprise a test to:
- execute an assembly code generation module on at least a portion of the one or more host devices to generate assembly code data associated with the executing application; and
- analyze the assembly code data generated during execution of the application to identify at least one communication of the application.

* * * * *